(12) United States Patent
Lucks

(10) Patent No.: US 8,548,751 B2
(45) Date of Patent: Oct. 1, 2013

(54) METHOD AND SYSTEM FOR MEASURING DEFLECTION OF A HOLLOW COMPONENT OF A WIND ENERGY SYSTEM FROM A NORMAL POSITION

(75) Inventor: Christoph Lucks, Hamburg (DE)

(73) Assignee: Windcomp GmbH, Hamburg (DE)

( * ) Notice: Subject to any disclaimer, the term of this patent is extended or adjusted under 35 U.S.C. 154(b) by 452 days.

(21) Appl. No.: 12/744,067

(22) PCT Filed: Nov. 12, 2008

(86) PCT No.: PCT/EP2008/065339
§ 371 (c)(1),
(2), (4) Date: May 21, 2010

(87) PCT Pub. No.: WO2009/068437
PCT Pub. Date: Jun. 4, 2009

(65) Prior Publication Data
US 2010/0318303 A1      Dec. 16, 2010

(30) Foreign Application Priority Data

Nov. 26, 2007 (DE) .......................... 10 2007 057 178
Dec. 6, 2007 (DE) .......................... 10 2007 059 165

(51) Int. Cl.
*G01B 5/28* (2006.01)

(52) U.S. Cl.
USPC .......................................................... 702/35

(58) Field of Classification Search
USPC .......................................................... 702/35
See application file for complete search history.

(56) References Cited

U.S. PATENT DOCUMENTS 5,383,368 A    1/1995  Franke
6,619,918 B1 *  9/2003  Rebsdorf .......................... 416/1
7,059,822 B2 *  6/2006  LeMieux et al. ................ 415/4.3
2004/0057828 A1 *  3/2004  Bosche ............................. 416/1
2004/0174542 A1    9/2004  Handman et al.

FOREIGN PATENT DOCUMENTS

| DE | 19520305 | 4/1997 |
|---|---|---|
| DE | 102006002708 | 7/2007 |
| DE | 102006002709 | 7/2007 |
| EP | 0146829 | 7/1985 |

(Continued)

*Primary Examiner* — Aditya Bhat
(74) *Attorney, Agent, or Firm* — Sand & Sebolt

(57) ABSTRACT

The invention relates to a method for measuring deflection of a substantially elongated hollow component (B) of a wind energy system from a normal position, extended such that it can be used to determine the deflection of the hollow component (B) of a of a wind energy system from a normal position in a simple and accurate manner, and to reliably monitor the same. To this end, the invention proposes that at least one distance sensor (8.1) for measuring distance in a non-contacting, directed manner is disposed at a first position, taking distance measurements from a target point in the direction of a second position within the hollow component (B), and that a measurement target (9.1) is further disposed in the interior of the hollow component (B) at the second position, said target comprising a target surface extending in a direction (x) transverse to a reference plane (R) perpendicular to the measurement direction (10) of the distance sensor (8.1) in a measurement area, and that distance measurements to the target surface are taken continuously or at intervals by the distance sensor (8.1), wherein the results of the distance measurements are evaluated in a processing unit, and an associated deflection of the hollow component (B) from the normal position is determined from said measurements, each with regard to the directional component of the direction (x) in which the target surface extends transverse to the reference plane (R).

18 Claims, 7 Drawing Sheets

(56) References Cited

FOREIGN PATENT DOCUMENTS

Figure 1:
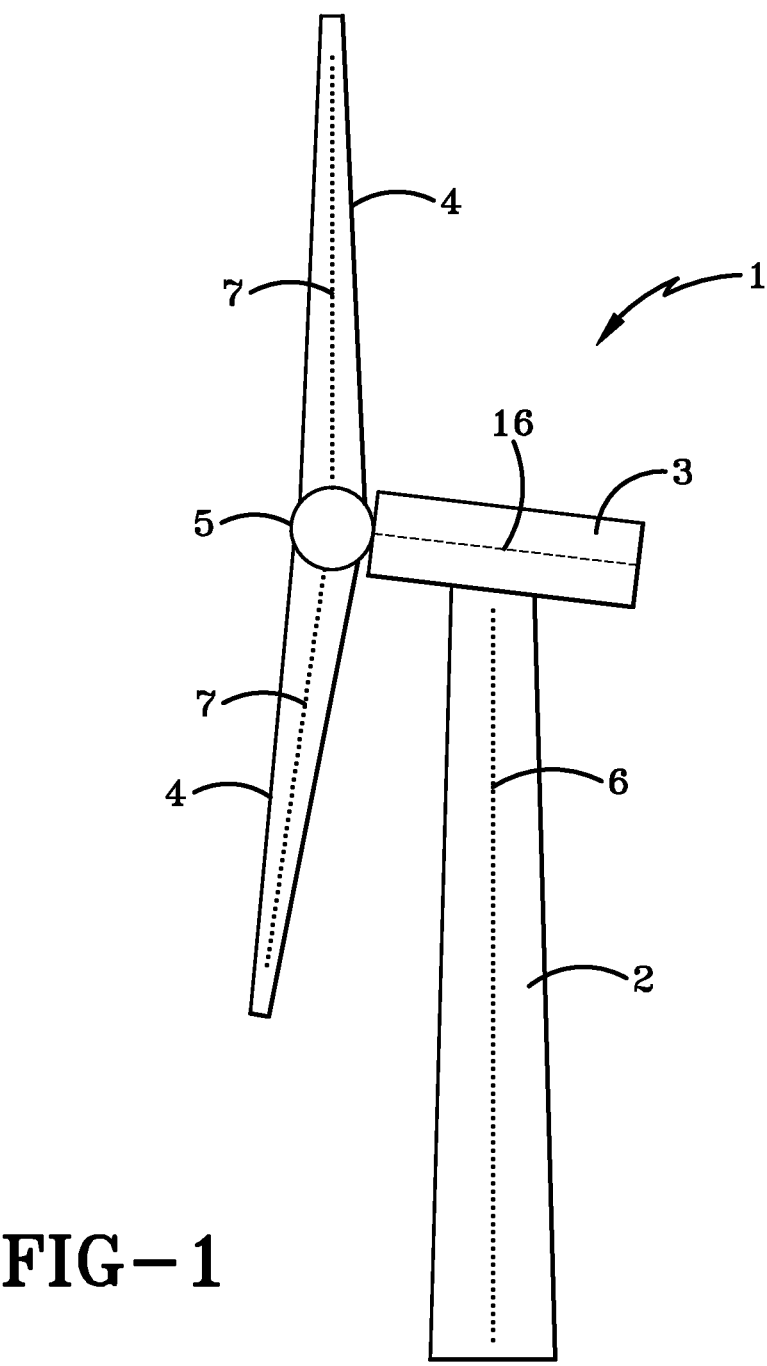

| JP | 08327400 | 12/1996 |
| JP | 2002131018 | 5/2002 |
| WO | 2006024146 | 3/2006 |
| WO | 2008123510 | 10/2008 |

* cited by examiner

METHOD AND SYSTEM FOR MEASURING DEFLECTION OF A HOLLOW COMPONENT OF A WIND ENERGY SYSTEM FROM A NORMAL POSITION

CROSS-REFERENCE TO RELATED APPLICATIONS

This is a National Stage entry of PCT/EP2008/065339 having an international filing date of Nov. 12, 2008, which application claims priority from German Patent Applications Serial Numbers DE102007057178.1 filed Nov. 26, 2007, and DE102007059165.0 filed Dec. 6, 2007, the entire specifications of which are incorporated herein by reference.

TECHNICAL SECTION

The invention concerns a method as well as a system for measuring the deflection of an essentially longitudinal, hollow component of a wind power installation from a normal position.

Hollow components in the sense of this invention are such components of the wind power system as are hollow inside and run essentially longitudinally at the same time. In particular, they are the rotor blades and the tower or such hollow components of a tower section if they are made hollow, as is usually the case today. But the machine housing (the gondola) and supporting parts disposed in the gondola can also be hollow components in the sense of this invention. They can also be measured with the method according to the invention with respect to deflection.

PRIOR ART

The predominant number of rotor blades in a wind power installation is manufactured of fiber-reinforced synthetic material. Characteristic of the construction of structural components made of fiber-reinforced synthetic materials is the different arrangement and direction of the fibers in the individual regions of the blade body. Different fibers such as glass and carbon fibers can also be combined together and be constructed as solid and sandwiched laminates. Consequently, rotor blades of a wind power installation make up a complex and asymmetric structure.

The task of a rotor is to convert the kinetic energy of the propelled air mass into usable torque. This should certainly occur in the course of a wind power installation's typical service life of 20 years, that is, without affecting the tower.

During use, the blade structure is dynamically loaded by both its own weight and the wind, the outer skin is exposed to the weather, and the laminate can take on moisture.

Rotor blades are usually laid out so that all the operational loads as well as the maximum loads of a strong wind gust can be safely absorbed over the course of a service life of 20 years. In the event that a laminate ages due to constant loadings and therefore all the material properties become time-dependent, this is countered in the layout of the blades by means of safety factors. This means that the rotor blades are usually sized such that they can still take up all loads after 20 years.

Secondly, edge conditions in manufacture and damage due to outside influences, such as during a lightning flash, for example, also have an effect on the durability of the rotor blades and their strength under maximum loads for one of the actual operating loads (incident flow at an angle, edgewise vibrations, stall effects, and the like).

Gradual reduction in material properties during operation due to the essential wear of the rotor blades. It is well known that the reduction in the material properties in fiber-reinforced synthetics is recognizable in the loss of stiffness and strength. These negative changes in material properties have been proven in laboratory tests on test bodies. It is also known that a change in stiffness is accompanied by a change in the eigenfrequency and a change in bending behavior. However, insofar as the knowledge derived from laboratory studies with simple test bodies (unidirectional fiber direction in a uniform fiber construction) is transferable to complex structures such as the rotor blades of wind power installations, this cannot be clearly grasped with the current state of the art.

In the experience up to now with the operation of wind power installations, in which there are, for example, unexpected collisions between a blade and the tower also occur, it is shown that with controlled operation of the rotor, stability essentially increases and faults can be detected early. A collision of the rotor with the tower in operation leads to considerable damage, even to total loss of the whole installation.

DE 10 2006 002 709 is devoted to the problem of metrologic monitoring of the bending of a rotor blade based on wind pressure (deflection in a direction essentially perpendicular to the rotor plane). Here reference points are created on the rotor blade close to the hub, on the one hand, and on the other hand, in the direction of the blade tip, which are connected to one another by means of a mechanical cable system. Upon deflection of the rotor blade due to wind pressure, a change occurs in the length of the cable, which is calculated by an evaluation unit for an actual deflection. Thus, for example, in strong wind or with material fatigue caused by aging, continuous deflection of the rotor blade bends it, with, at worst, its collision with the tower.

The system described in this paper is too expensive to be fitted on a rotor blade, and in particular, it can be fitted only with difficulty. Secondly, it is always limited, in monitoring the deflection of the rotor blade, to the direction essentially perpendicular to the rotor-blade plane. Further deflection of the rotor blade within the rotor plane, which the rotor blade experiences due to its own weight in positions deviating from the vertical, cannot be sustained in this system. However, such deflections also give valuable information on aging effects and any material fatigue. Finally, the mechanical system disclosed in this paper is sluggish in measurement due to the inertia of the very mechanics, so that, vibration effects and the like, for instance, are not, as a rule, established with sufficient accuracy and can be measured.

A further method for establishing deflection of a rotor blade for a wind power installation is disclosed in DE 10 2006 002 708 A1. There, the light ray of a laser proceeds onto a reflection prism. The light ray is reflected back from a detector, which analyses the incidence position of the reflected beam. Deflection of the rotor blade leads to a shift in the prism position. This in turn leads to changes in the incidence point of the light ray reflected from the detector, which does not have this position change and makes an evaluation unit available. This device is admittedly simpler to upgrade than that described in DE 10 2006 002 709 A1; however, costly and sensitive components are required for this. In addition, to a prism of optical quality made as a reflective body, there can be additionally provided a detector for a laser emitter, which records the measurement position, according to the type of line-scan camera or the like. Such a detector is expensive to purchase. It must be provided with a power source and data lines for this. Also, it is comparatively susceptible to disturbances and thus represent a possible source of error.

The tower of a wind power installation is also subject to forces which load the material, usually steel or reinforced concrete. At the considerable height of today's wind power installations of 100 m or more, measurable deflections also occur in the area of the tower, due to wind pressure affecting the wind power installation. Here, material fatigue must also be monitored and a timely warning be given. For this, the measurement of an occurring deflection is also of high value for the further development of material and/or construction of this component.

REPRESENTATION OF THE INVENTION

This concerns the invention. In particular, the task of the invention, a method, and a system will be presented, in which the deflection of a hollow component of a wind power installation from a normal position is established by simple and robust means and can be reliably monitored, according to each embodiment of the invention, even for different deflection directions.

Solutions for this task are presented in the claims.

The basic concept of the invention consists in the fact that installed within the hollow component is at least one pair comprised of a contact-free distance sensor, which allows a directed distance measurement, and an assigned measurement target. The distance sensor is arranged in a first position; the measurement target is in a second position, in which it can be scanned by the distance sensor. The essential effect in this is that the measurement target has a target surface area, which extends transversely to a reference plane, which is perpendicular to the measurement direction of the distance sensor, as viewed in either of two directions. When the hollow component is deflected from a normal position with a directional component in the direction of this transversely oriented path of the target surface, the measurement target is displaced relative to the distance sensor, so that, depending on the deflection in this direction, the sensor measures different distances to the measurement target or to the target surface. Nevertheless, a component of the deflections in this direction, in which the target surface extends transversely to the reference plane, can be unambiguously assigned to a each measured distance. The path of a surface transversely to the reference plane includes not only a correspondingly inclined path, but also a discontinuously stepped path, including one with surface sections at different distances, but otherwise lying parallel to the reference plane.

The system is hereby simple and robust; it is simple to upgrade (by displaying the measurement targets and installing sensors) and is low-maintenance.

The distance sensor is, according to the invention, attached to a computer unit, which performs the evaluation of the deflection using the distances measured. It is important here that the distance sensor in essence makes a point-precise distance determination, as can be done, for example, using a laser distance sensor (cf. claim 13). But basically other types of contact-free distance sensors are also conceivable, as long as they can make a directed and essentially point-precise distance measurement. Directed ultrasound sensors would be conceivable here, for example. If a measurement beam is measured (ultrasound, radar, laser, or the like), it is not especially required that this be fully reflected. Also, with an obliquely disposed surface of incidence for the measurement target, a still sufficient number of measurement beams is backscattered at not too shallow incidence angles, which is enough for distance determination.

In order to allow the deflection of a hollow component to be measured in two different, linearly independent directions in a simple manner, a method such as that presented in claim 2 and a system according to claim 7 can be used.

In such a process, for each of the directional components of the deflection being determined, at least one distance sensor and one measurement target related to it are provided, in which the target surface areas are so oriented that with distance measurement using the related distance sensor, one of the directional components of the deflection can be determined. In a simple manner, this can be achieved with two measurement targets with flat surfaces, which are formed and oriented as presented in claim 8. In particular, if, due to a comparatively large distance between distance sensor and measurement target, the diameter of the measurement point of the distance sensor on the measurement target is not negligible, such an arrangement allows a reliable measurement of the deflection in different directions to be performed with high accuracy.

With a sufficient spatial limitation of the measurement beam at the target point, measurement of the deflection of the hollow component can also be made in two linearly independent directions with only one pair comprising a contact-free distance sensor and a measurement target. One possible procedure for this is presented in claim 3, with a corresponding measurement system cited in claim 9. The essential effect here is that the measurement target has a surface area that extends bent or inclined in relation to a reference plane that is essentially perpendicular to the measurement direction of the distance sensor, and thus has different distances to the distance sensor at its different surface points. When the hollow component is deflected from its normal position, the measurement target is then displaced relative to the distance sensor, so that the sensor measures different distances to the measurement target or to the target surface, based upon the deflection. What is more, both deflections in a first direction (x direction) lying parallel to the reference plane and deflections in a second direction (y direction), lying perpendicular to the first direction and also parallel to the reference plane, and especially combined deflections, can also be unambiguously assigned to a measured distance.

In one possible embodiment of the target surface of this variant, the surface is constructed like a staircase in a first direction, which extends transversely to the measurement direction, with adjoining steps having a different distance to the reference plane at each measurement point, viewed in the direction that extends transversely to both the direction of the staircase-like step and the measurement direction, wherein the jumps in distance between the steps in the direction of the reference plane are greater than the jump in distance within each respective step. At the same time, the individual steps can be provided with inclined continuous surfaces or can themselves be stepped. It is simply important that a movement exist and be reversed between the point of a first step with the smallest distance to the reference plane and the point with the greatest distance to the reference plane from the next step. Such a measurement target according to the embodiment can itself also be viewed independently of the invention and can, in particular, represent an essential element of the system according to the invention.

In particular, such a method and system according to the invention comes about in a rotor blade or several rotor blades or for use in the tower of a wind power installation. What is more, it is of practical advantage in assembling a rotor blade to place the distance sensor close to the root of the rotor-blade or to the rotor hub and to set the measurement target in the direction of the rotor-blade tip. Naturally, an arrangement can also occur in the reverse direction, although the above-mentioned arrangement has the advantage that the distance sensor can be supplied with power by the hub and in this area is, if necessary (maintenance, replacement) more readily accessible. In measuring the tower of a wind power installation, the arrangement (distance sensor above or below) is the same in principle. The use of the method and system for measurement in the area of the machinery housing (the gondola) of a wind power installation is also conceivable. There, with this arrangement, for example, so-called "dancing" (or vibrations) of the machinery supports, which in the sense of this invention also represent a hollow component, are recorded.

The measurement target is arranged, for as precise a measurement as possible of the actual deflection, to be as far as possible away from the distance sensor. At the same time, though, it will be observed from this that at the maximum expected bending or deflection of the hollow component, the measurement beam of the contact-free distance sensor must still be incident upon the target surface. Furthermore, the diameter of the measurement beam over the distance between the distance sensor and measurement target must not be too large, in order to be able to achieve measurements that can still be evaluated. Also, this distance is limited here by a maximum distance. Accordingly, with an arrangement in the rotor blade in which the distance sensor is disposed in the area of the rotor-blade root, as a rule, the measurement target is not disposed at the outermost tip of the rotor blade, but is located closer to the rotor-blade root. Preferably, the measurement target is, at the same time though, disposed within the third of the rotor blade facing the rotor blade tips.

It is furthermore conceivable, in a hollow component, to arrange a measurement distance with several pairs, disposed lengthwise behind one another, of at least one distance sensor and one related measurement target, in order, for example, to establish and to measure a bending profile.

With the method according to the invention or using the system according to the invention, the data acquired can be input for controls which, depending on the predetermined actions, perform an intervention in the course of operating the wind power installation. Thus the wind power installation, by way of example, with material fatigue established and an impending collision of a rotor blade with the tower, can be stopped and taken out of the wind. But in normal facility operation, operating conditions that increase load and reduce profit, such as aerodynamically excited imbalances resulting from turbulent flow situations, can be recognized at the sweeping rotor surfaces and be stopped by a correction to the installation controls.

In addition, it is an advantage if the measurement data of the system according to the invention, preferably for all the measured hollow components, is stored in the controls and held for later evaluation. Thus, the controls, can also recognize, for instance, the age-conditioned needed replacement of a hollow component (a rotor blade, for instance).

BRIEF DESCRIPTION OF THE DRAWING FIGURES

Figure 2:
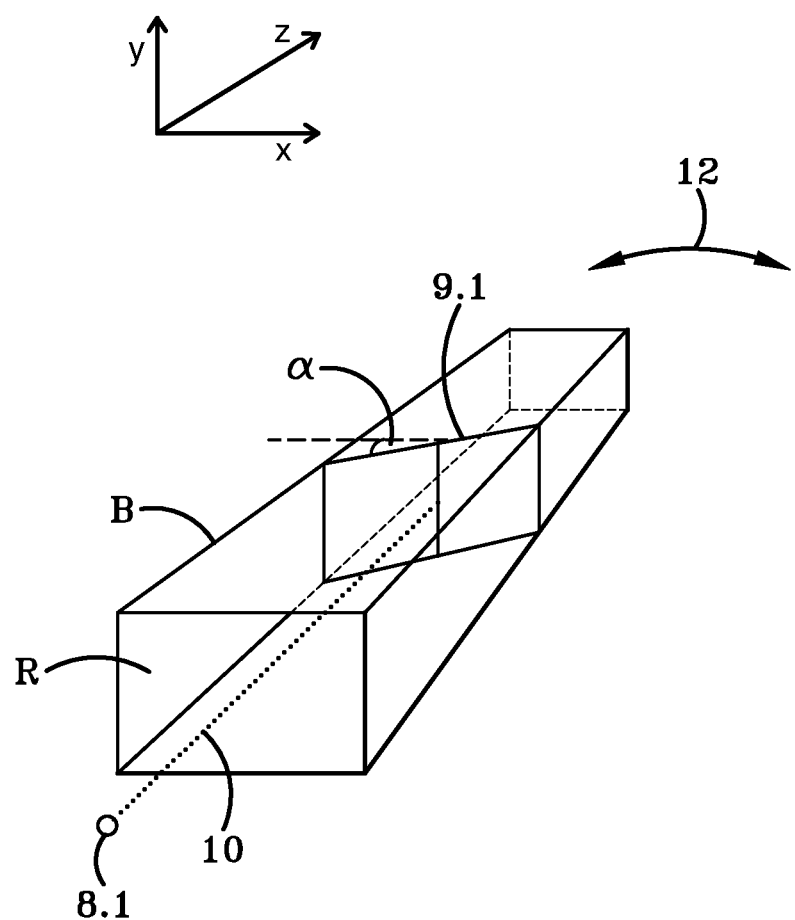
Figure 3:
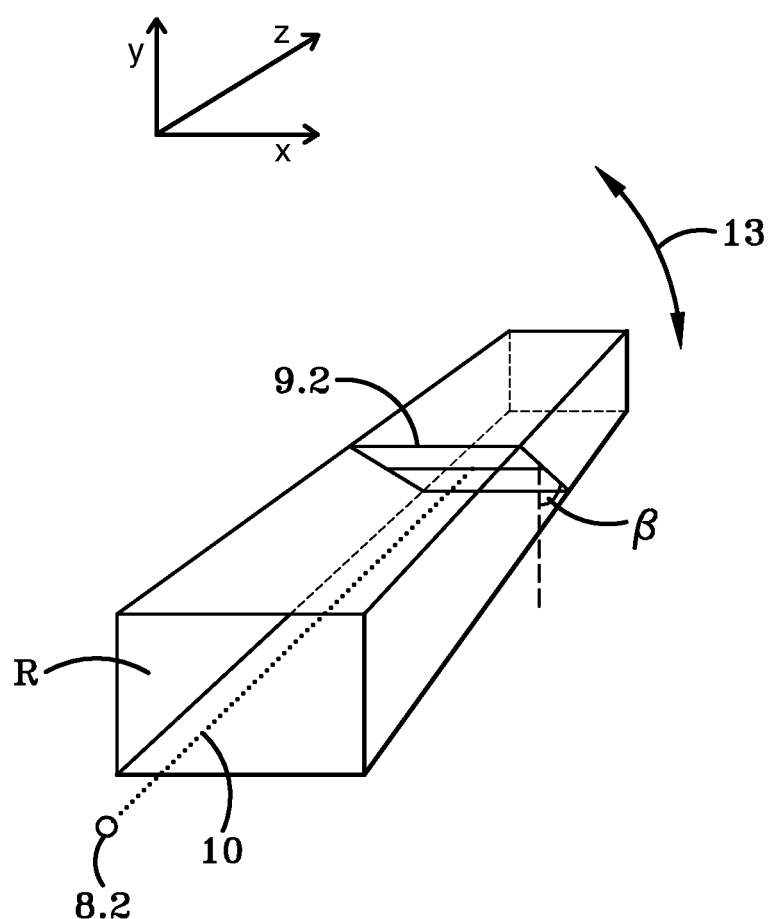
Figure 4:
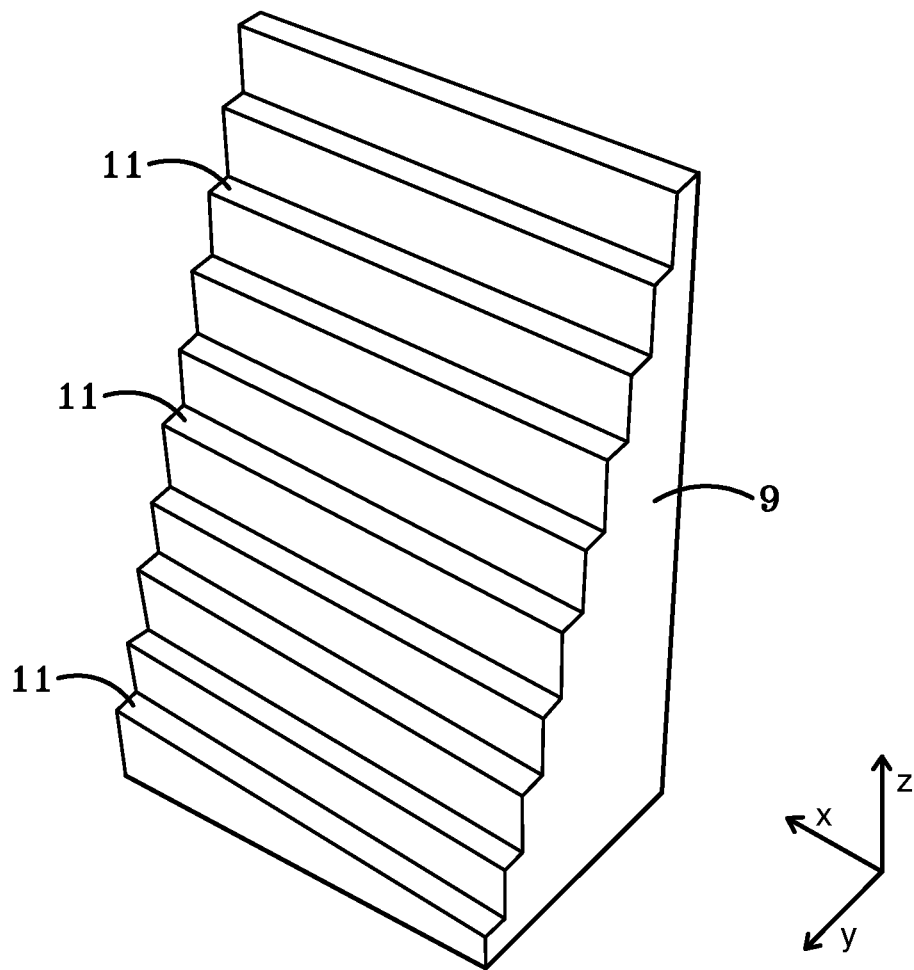
Figure 5:
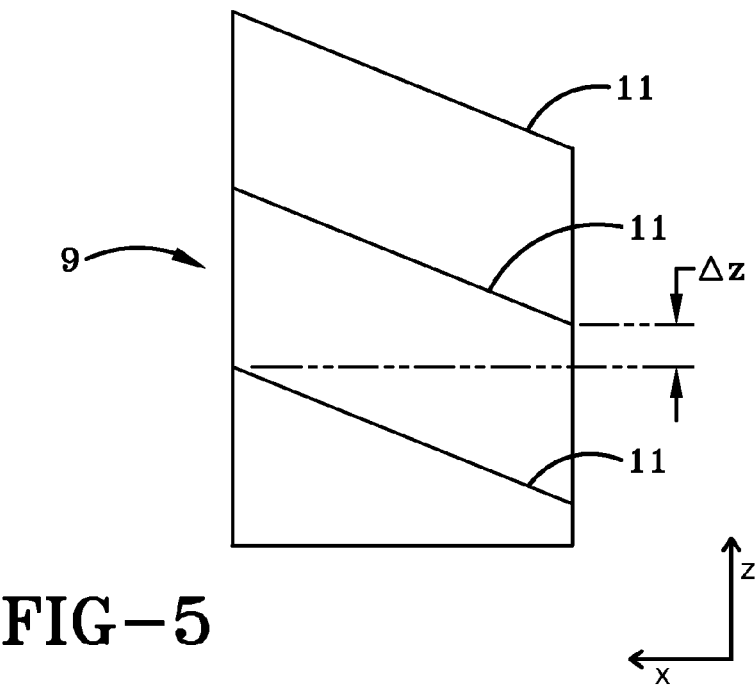

Further advantages and characteristics of the invention result from the following description of the embodiments, using the enclosed figures. Here are shown:

FIG. 1, schematically, a side view of a wind power installation with suitable measurement distance sketched thereon for executing the method according to the invention and the use of the system according to the invention;

FIG. 2, a diagrammatic representation of a component or hollow component for the general explanation of the principle of the method and system according to the invention in a first variant;

FIG. 3, a diagrammatic representation of a component or hollow component for the general explanation of the principle of the method and system according to the invention in a second variant;

FIG. 4, schematically, in a three-dimensional view, a measurement target for use in the method and system according to the invention;

FIG. 5, in a highly schematic front view of a section cut from the measurement target according to FIG. 4 to explain the principle of this measurement target.

Figure 7:
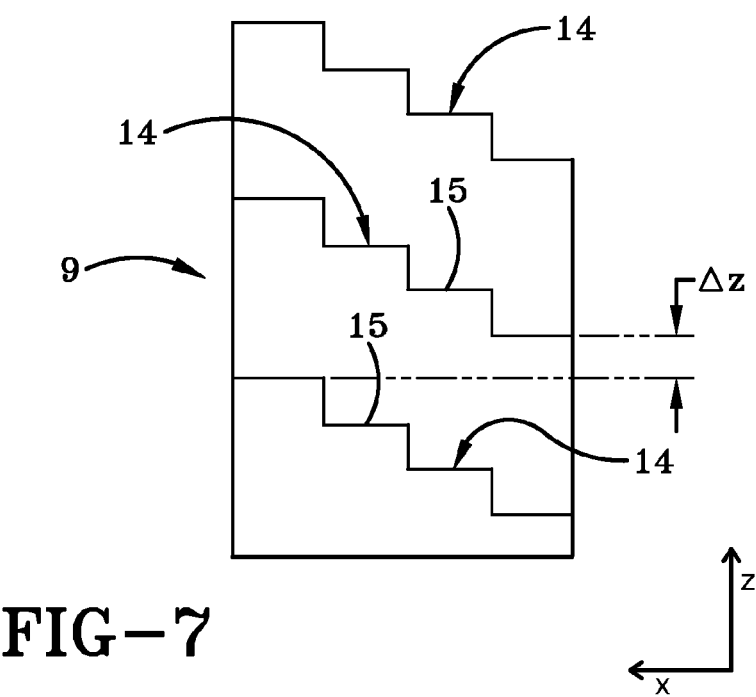
Figure 6:
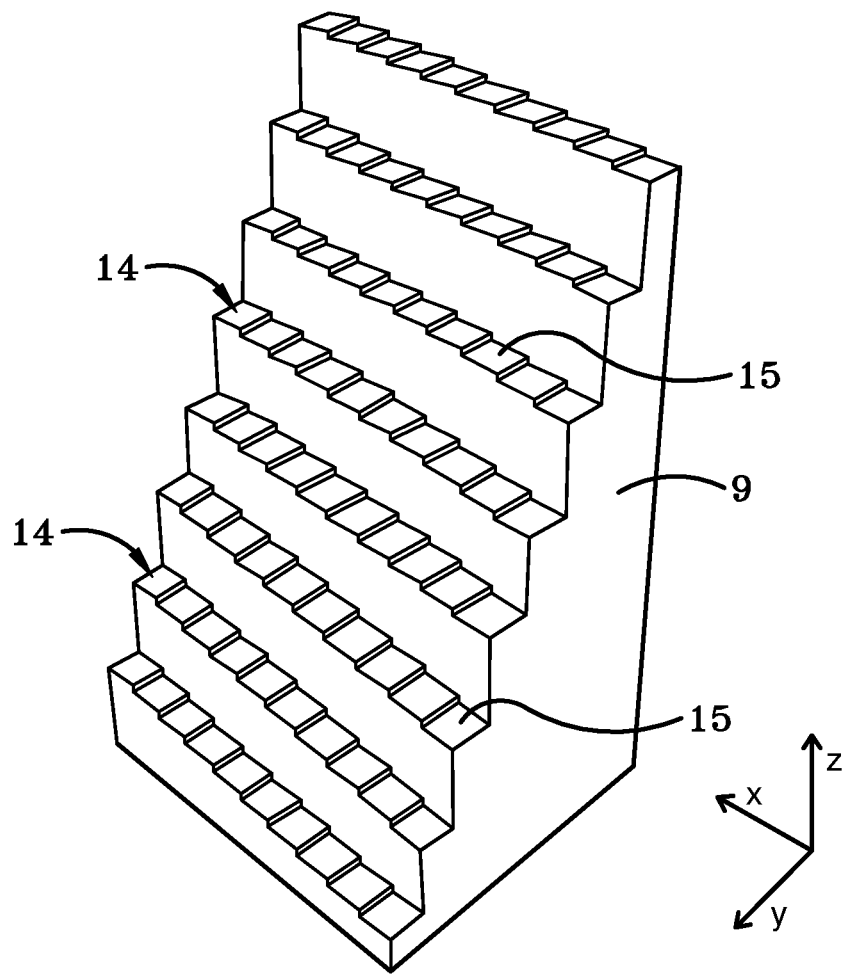
Figure 8:
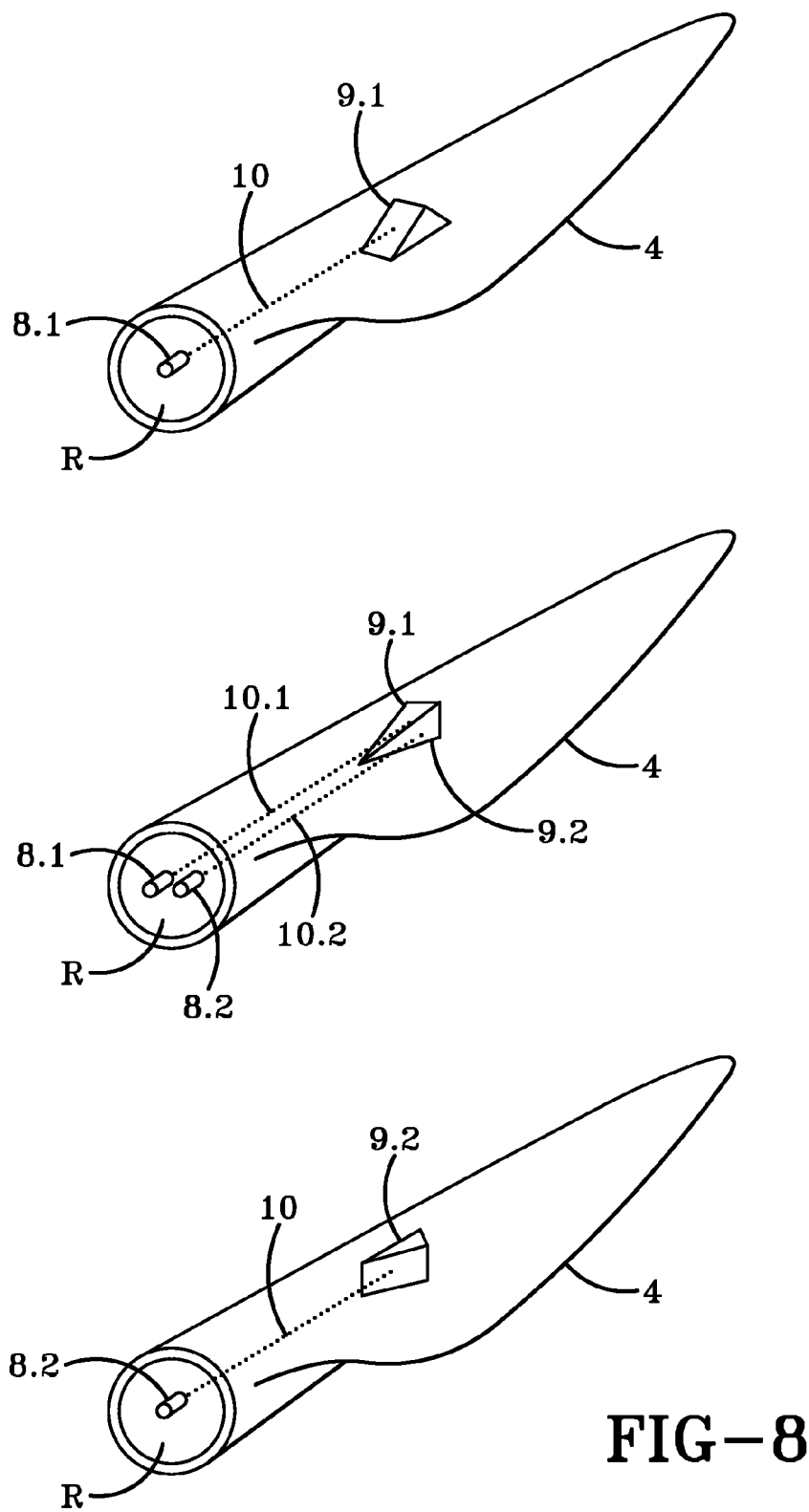

FIG. 6, schematically, in one of the three-dimensional views according to FIG. 4, a further measurement target for use in the method and system according to the invention;

FIG. 7, in a highly schematic front view similar to FIG. 5, a section cut from the measurement target according to FIG. 6 to explain the principle of this measurement target; and FIG. 8, schematically, in three representations, the course of the method relative to a schematically depicted rotor blade.

MEANS FOR EXECUTING THE INVENTION

A wind power installation 1 depicted schematically in FIG. 1 is set, in essence, together with a tower 2 with a rotatable gondola 3 set thereon and a rotor attached to the gondola from which are rotor blades 4 set onto a hub 5.

The individual components of the wind power installation 1 are subject to directed forces based on different loads, which can be responsible for the deflection or bending of these components. For example, the tower 2, which today is usually manufactured as a hollow component made of steel or reinforced-concrete elements, is deflected from a rest position, based on wind pressure loading the rotor in the direction of wind flow. The rotor blades 4 are likewise, due to wind pressure, deflected from a common rotor plane in the direction of flow. They furthermore are subject to the vertical effect of gravity operating downward within the rotor plane, which causes further bending and thus deflection from a normal position. In particular, the rotor blades therewith experience, at the same time, deflections with components in two different directions at right angles to one another.

These deflections of both the rotor blades 4 and the tower 2 can be recorded with a method and system according to the invention, to be subsequently described in more detail, in any case in a directional component, which is indicated in FIG. 1 by the marking of the measurement distance 6 (in the tower) and 7 (in the rotor blades). A further measurement distance 16 is indicated in FIG. 1 at the gondola 3. It runs in the longitudinal direction of the gondola, more precisely along the longitudinal direction of the drive belt disposed there. With this measurement distance 16, it is clarified that deflections can be monitored, particularly for the machinery supports disposed in the gondola 3, which, for example, with the so-called "dancing" occurring in the machinery supports and in particulars are attributed to undesirable imbalances in the drive belt.

In FIG. 2, the basic principle of the method according to the invention and the system according to the invention is explained in a first variant, using a hollow structural component B, indicated in perspective here, for a simple representation as a block. For better orientation, a coordinate system of coordinates x, y, and z is depicted in FIG. 2. Here, a simple, distance sensor 8.1 indicated by a dotted line for contact-free distance measurement is oriented with its measurement beam 10 running within the hollow space of the component B. The measurement beam 10 targets a measurement target 9.1, disposed inside the hollow component, which is shifted a distance in the longitudinal direction of the component B, which exhibits a target surface facing the distance sensor 8.1. In this rectangular depiction it is easily recognized that the measurement target 9.1 is formed by a flat target surface on which this plane is inclined relative to a reference plane R, which forms a plane perpendicular to the measurement beam 10, as well as the measurement direction of the distance sensor 8.1. The inclination is thus borne in a spatial direction, more precisely an inclination at an angle α about the y-axis lying in the reference plane.

A situation is thereby created in which in the direction of the x-axis or points lying on a parallel line of the target surface of the measurement target 9.1 which surface is scanned by the distance sensor 8.1 each exhibit a different distance to the reference plane R. If a deflection now occurs in the component B, that is, bending, the point changes, at which the measurement beam 10 of the distance sensor 8.1 is incident upon the target surface of the measurement target 9.1. Consequently the distance sensor establishes another distance from that in the unloaded normal position. Because each measured distance is unambiguously related to a distance component in the x direction on the target surface of the measurement target, this measured distance can be related to a lateral deflection component of the measurement target 9.1 in this x-direction, which is indicated by the corresponding arrow 12. This situation is shown schematically in a rotor blade 4 in FIG. 8 in the top illustration.

The measurement target 9.1 (like all the rest of the following measurement targets still to be described) is thus not constructed, for instance, as a reflector for the measurement beams used. It can be formed, for a preferred optical distance measurement used here (with a laser), for instance as a simple, light-colored plate made of plastic or a a hollow material.

In FIG. 3, a similar situation is shown with a distance sensor 8.2 disposed in a component B schematically represented in turn as a block and a measurement target 9.2. Here the measurement target 9.2 again provided with a flat target surface, which this time is inclined about the x-axis lying in the reference plane R, here about the angle β. In this arrangement, the distance between the reference plane R (that is, to the distance sensor 8.2) and the measurement target 9.2 is different from that along the direction of the y-axis or points running in parallel lines to it, so that with a deflection of the hollow component B the deflection component can be measured by measuring the distance in this y-direction, which is illustrated by the double arrow 13. Also here, in FIG. 8, this situation is shown this time in the bottom illustration on a rotor blade.

It is now without any further ado apparent that a combined arrangement of a pair of a distance sensors 8.1 and a measurement target 9.1, as well as of a pair of a distance sensor 8.2 and a measurement target 9.2, can be measured for the x- and the y-components of the deflection, and consequently the deflection can be completely determined. What is more, with the application of a measurement body with different surfaces, both measurement targets 9.1 and 9.2 are also achieved in a single measurement body, which then depicts two measurement targets. This situation is shown in FIG. 8 in the middle illustration, where the measurement beams of both distance sensors 8.1 and 8.2 are designated by 10.1 and 10.2.

Alternatively, one can proceed with one pair of a distance sensor and a measurement target 9, if the measurement target for each (measurement) point exhibits a unique distance to the reference plane R at the target surface. Examples of such possible measurement targets 9 are shown in FIGS. 4 and 5, as well as 6 and 7.

In a first example of such a measurement target suitable for the simultaneous measurement of deflection in two linearly independent directional components, such as is shown in FIGS. 4 and 5, the measurement surface consists of sections 11 in staircase-like steps in the y-direction, in which the surfaces run at a slant to the reference plane R. As is particularly clear from FIG. 5, the points of the single sections 11, each very close to one another, are set apart by a distance difference (a movement) Δz from one another. Thus with a distance measurement, the scanned position (the measurement point) on the target surface can be determined in a simple manner, allowing the deflection of the hollow component in the x- as well as the y-direction (the directions lying in the reference plane) to be determined using simple trigonometric calculations.

A further example of a possible measurement target 9 for the simultaneous measurement of deflection in a hollow component in both the x- and y-direction is depicted with only one distance sensor in FIGS. 6 and 7. Here also various sections 14 are provided, arranged staircase-like one above the other, which, however, in contrast to the measurement target 9 shown in FIGS. 4 and 5, are not continuous and run at a slant to the reference plane R, but for their part are likewise step-shaped in individual steps 15. Each of these steps 15 results in a measurement point, so that the solution of the measurement points and consequently the accuracy of the system can be determined using the size of the steps 15. Also, it is again important here, and as is readily recognized in the illustration FIG. 7, that a distance difference Δz exist between the adjacent steps 15 of neighboring sections 14, in order to guarantee the lack of ambiguity in the distance measurement in a specified deflection of the hollow component provided with such a measurement target.

The measurement targets 9 shown in FIGS. 4, 5 and 6,7 were developed by the inventor specifically for this application. They can, however, also find a use in applications other than in the field of measuring the deflection of hollow components in wind power installations, for example in the field of measuring deflection in bridge components, ships, aircraft wings, aircraft fuselages, elements of roof constructions in structures, components of dams, barriers, and dike systems, or the like. These also represent, in this respect, an independent invention.

The contact-free distance sensor 8.1, 8.2 is preferably a laser distance sensor, as such sensors can be easily implemented and cost-effectively obtained, and can be built into a wind power installation 1.

It should be plausible that with the method of measurement according to the invention described here for deflection in a hollow component of a wind power installation 1, a method and a system is created which means not only a particularly simple technical achievement, low-maintenance and problem-free which can be upgraded, but that this method also allows, in especially advantageous embodiments, a deflection of the hollow components from a normal position to be recorded or monitored in two linearly independent spatial directions.

The data obtained to advantage using the method according to the invention and the system according to the invention on a deflection in the hollow component of the wind power installation 1 is used to construct a load history. So too, the data can also be used to provide control for the wind power installation 1. In particular, for instance, with the method according to the invention established deviations from normal operating behavior can be recorded in the form of additional pivoting movements, vibrations of the rotor blade, of the entire rotor, and of the tower 4, and be used, for example, as a reason to correct the operating behavior, by adjusting the so-called pitch angle of the rotor blade 4, for instance. A warning can be regularly given upon a critical material fatigue being established. These advantages can be achieved in particular, because the system according to the invention makes possible fast, reliable, and disturbance-resistant recording and monitoring of the deflections from the normal position of a hollow spatial component of a wind power installation 1.

REFERENCE LIST

1 Wind power installation
2 Tower
3 Gondola
4 Rotor blade
5 Hub
6 Measurement distance
7 Measurement distance
8.1, 8.2 Distance sensor
9, 9.1, 9.2 Measurement target
10, 10.1, 10.2 Measurement beam
11 Section
12 Arrow
13 Double arrow
14 Section
15 Step
16 Measurement distance
B Component
R Reference plane
$\Delta z$ Distance difference

The invention claimed is:

1. A system for measuring a deflection from a normal position of an essentially longitudinal hollow component of a wind power installation, comprising:
   a) at least one distance sensor within the hollow component disposed in a first position for contact-free, directed distance measurement in the direction of a second position located within the hollow component and longitudinally spaced from the first position along a longitudinal axis of the hollow component so that the second position is longitudinally spaced in a longitudinal measurement direction from the first position;
   b) at least one measurement target disposed at the second position and scanned by the at least one distance sensor, with a target surface that extends in a measurement area transversely to a reference plane, which is perpendicular to the longitudinal measurement direction of the at least one distance sensor, viewed in either direction; and
   c) a computer unit for evaluating the distances determined by the at least one distance sensor to the target surface and defining a deflection of the hollow component from the normal position in any case with respect to the directional components of the directions, in which the target surface runs transverse to the reference plane, from these data.

2. The system according to claim 1, further comprising:
a first distance sensor and a first measurement target; and
a second distance sensor and a second measurement target;
   wherein for a measurement of the deflection of the hollow component in two linearly independent directional components, the first measurement target exhibits a first target surface which runs in a measurement area of a first direction viewed transverse to a reference plane perpendicular to a measurement direction of the first distance sensor; and in which the second measurement target exhibits a second target surface which runs in a measurement area in a second, different direction to the first direction viewed transverse to a second reference plane perpendicular to a measurement direction of the second distance sensor; and in which the first and second distance sensors are linked for data transmission to the computer unit.

3. The system according to claim 2, wherein the first and second target surfaces of the respective first and second measurement targets are flat and are inclined to a common reference plane for the first and second distance sensors, in which the first target surface about a first axis runs within or parallel to the reference plane and the second target surface about a second axis runs within or parallel to the reference plane and wherein the second axis intersects the first axis, and the first and second target surfaces are inclined relative to the common reference plane at an angle of about $\alpha$ or $\beta$, respectively, for which $0°<\alpha, \beta<90°$.

4. The system according to claim 1, wherein the at least one measurement target exhibits a target surface which, at each measurement point exhibits a different distance to the reference plane perpendicular to the measurement direction of the at least one distance sensor.

5. The system according to claim 4, wherein the at least one measurement target in a first direction running transverse to the measurement direction is constructed like a staircase with neighboring steps; wherein the at least one measurement target exhibits a different distance to the reference plane seen in a path direction transverse to the direction of the staircase-like steps and also the path direction lying transverse to the measurement direction, and in which greater jump distances exist between the steps in the direction of the reference plane than the jump distances within each step.

6. The system according to claim 5, wherein the steps run continuously at an angle in the path direction.

7. The system according to claim 5, wherein the steps include a number of stepped sections, each of which having a different distance to the reference plane.

8. The system according to claim 1, wherein the at least one distance sensor is a laser sensor.

9. The system according to claim 1, wherein the computer unit exhibits controls or is connected to such which, for intervention in the course of operating the wind power installation, is directed based on the deflection data determined for the hollow component.

10. The system according to claim 1, comprising a measurement pair consisting of at least two respective distance sensors and measurement targets, in which the measurement pairs are disposed along the longitudinal extent of the hollow component one after the other.

11. The system according to claim 1, wherein the hollow component is the root of a rotor blade and a rotor blade exhibiting a rotor blade tip opposite it, and wherein the first position is a position facing the rotor-blade root and the second position is a position set in the direction of the rotor-blade tip; and which second position radiates from the first position.

12. The system according to claim 11, wherein the at least one measurement target is disposed in an area of the rotor blade which is located within the third of the rotor blade facing the tip of the rotor blade.

13. The system according to claim 1, wherein the hollow component is one of a tower and a section of a tower of the wind power installation.

14. A method for measuring deflection of an essentially longitudinal hollow component of a wind power installation from a normal position; said method comprising:
   positioning a distance sensor at a first position on the inside of the hollow component;

positioning a measurement target at a second position on the inside of the hollow component, where the second position is spaced a distance longitudinally from the first position along a longitudinal axis of the hollow component so that the measurement target is longitudinally spaced in a longitudinal measurement direction from the distance sensor;

orienting a target surface on the measurement target transversely to a reference plane that is perpendicular to the longitudinal measurement direction in which a distance measurement is to be taken;

directing a measurement ray from the distance sensor toward the target surface;

measuring the length of the measurement ray from the distance sensor to a target point on the target surface without contacting the distance sensor and/or the target surface, thereby generating a contact-free distance measurement taken in the longitudinal measurement direction;

taking a plurality of the contact-free distance measurements from the distance sensor to the target point over a period of time; where the distance measurements are taken continuously or at intervals;

evaluating the plurality of distance measurements with programming in a computer unit; and determining a deflection of the hollow component from the normal position utilizing the plurality of evaluated distance measurements.

15. The method according to claim 14, where the hollow component is the root of a rotor blade as well as a rotor blade having a rotor-blade tip; and the steps of positioning the distance sensor and the measurement target include the steps of:

positioning the distance sensor proximate the rotor blade root; and positioning the measurement target a distance from the rotor blade root and towards the rotor blade tip.

16. The method according to claim 14, where the hollow component is one of a tower and a section of a tower of the wind power installation; and the steps of positioning the distance sensor and measurement target include positioning the distance sensor and measurement target within an interior of the tower or section of the tower.

17. A method for measuring deflection of an essentially longitudinal hollow component of a wind power installation from a normal position in two linearly independent directional components; said method comprising:

positioning a first distance sensor at a first position on the inside of the hollow component;

positioning a second distance sensor at a second position on the inside of the hollow component;

positioning a first measurement target at a third position on the inside of the hollow component, where the third position is spaced a distance longitudinally from the first position along a longitudinal axis of the hollow component so that the first measurement target is longitudinally spaced in a longitudinal measurement direction from the first distance sensor;

positioning a second measurement target at a fourth position on the inside of the hollow component, where the fourth position is spaced a distance longitudinally from the second position along a longitudinal axis of the hollow component so that the second measurement target is longitudinally spaced in the longitudinal measurement direction from the second distance sensor;

orienting a target surface of the first measurement target transversely to a first reference plane in a first direction, wherein the first reference plane is perpendicular to the longitudinal measurement direction in which a distance measurement is to be taken;

orienting a target surface of the second measurement target transversely to a second reference plane in a second direction, wherein the second reference plane is perpendicular to the longitudinal measurement direction in which a distance measurement is to be taken; and wherein the first and the second directions are linearly independent;

directing a first measurement ray from the first distance sensor toward the target surface on the first measurement target;

directing a second measurement ray from the second distance sensor toward the target surface on the second measurement target;

measuring the length of the first and second measurement rays from the respective first and second distance sensors to a respective target point on the respective target surfaces without contacting the distance sensors and/or the target surfaces, thereby generating a contact free distance measurement for each of the target surfaces;

taking a plurality of the contact-free distance measurements from the first and second distance sensors to the target points over a period of time; where the distance measurements are taken continuously or at intervals;

evaluating the plurality of distance measurements with programming in a computer unit; and determining a deflection of the hollow component from the normal position in two linearly independent directions utilizing the plurality of evaluated distance measurements.

18. A method for measuring deflection of an essentially longitudinal hollow component of a wind power installation from a normal position in two linearly independent directional components; said method comprising:

positioning a distance sensor at a first position on the inside of the hollow component;

positioning a measurement target at a second position on the inside of the hollow component, where the second position is spaced a distance longitudinally from the first position along a longitudinal axis of the hollow component so that the measurement target is longitudinally spaced in a longitudinal measurement direction from the distance sensor;

orienting a target surface to a reference plane that is perpendicular to the longitudinal measurement direction in which a distance measurement is to be taken; said target surface having a plurality of target points thereon such that said target surface for each of the target points is at a different distance from the reference plane;

directing a measurement ray from the distance sensor toward the target surface on the measurement target;

measuring the length of the measurement ray from the distance sensor to a selected one of the target points hit by the ray on the target surface without contacting the distance sensor and/or the target surface; thereby generating a contact-free distance measurement taken in the longitudinal measurement direction;

taking a plurality of the contact-free distance measurements from the distance sensor to the selected one of the target points over a period of time; where the distance measurements are taken continuously or at intervals;

evaluating the plurality of distance measurements with programming in a computer unit; and determining a deflection of the hollow component from the normal position utilizing the plurality of evaluated distance measurements.

* * * * *